June 20, 1967  J. LOTHEN  3,326,327
CABLE CAR BRAKE MECHANISM
Filed Oct. 18, 1965  2 Sheets-Sheet 1
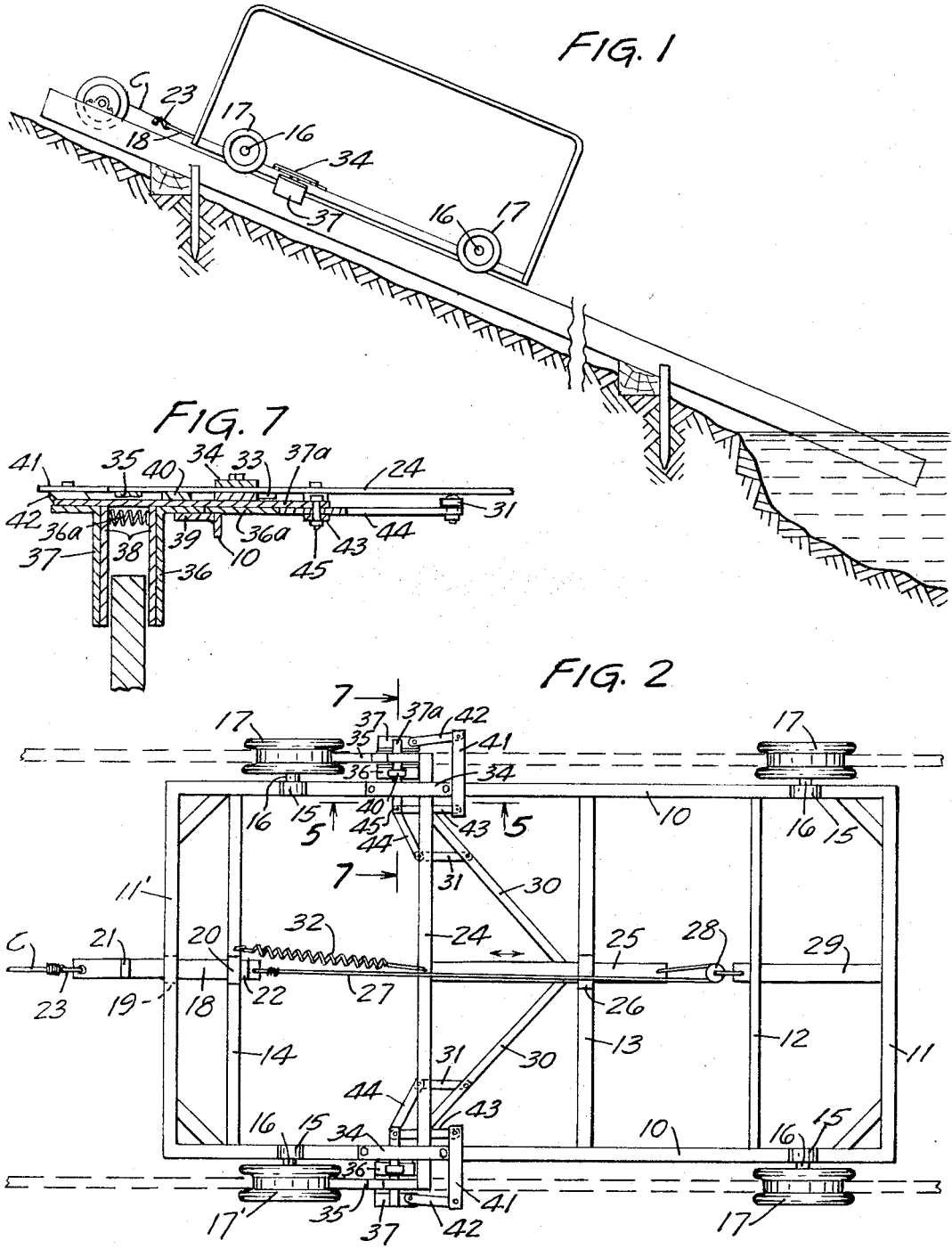
INVENTOR
JULIUS LOTHEN
BY
Williamson & Palmatier
ATTORNEYS June 20, 1967 — J. LOTHEN — 3,326,327

CABLE CAR BRAKE MECHANISM

Filed Oct. 18, 1965 — 2 Sheets-Sheet 2

INVENTOR
JULIUS LOTHEN
BY Williamson & Palmatier
ATTORNEYS

United States Patent Office 3,326,327
Patented June 20, 1967

1

3,326,327
CABLE CAR BRAKE MECHANISM
Julius Lothen, 1600 Elliot Ave., Minneapolis,
Minn. 55404
Filed Oct. 18, 1965, Ser. No. 497,307
9 Claims. (Cl. 188—36)

ABSTRACT OF THE DISCLOSURE

The cable car braking mechanism for a rail-riding wheeled vehicle including a wheel-engaging brake comprising a skid and a rail brake comprising a pair of jaws which are movable into and out of gripping relation with respect to a rail. A spring urged linkage connected to the wheel and rail brakes and to the towing mechanism of the vehicle. The spring of the spring urged linkage maintaining both the wheel and rail brakes out of braking relation when the vehicle is being towed, but causing the wheel and rail brakes to grip the wheel and rail respectively when the towing force is removed.

This invention relates to automatic brake mechanism for drawn or towed railway cars.

The invention has particular applicability to cable drawn rail-riding vehicles which travel up and down over inclined grades and therefore the following description is directed to this particular application of the brake mechanism of this invention, although it will be clearly understood that the scope of the invention is not limited thereto, and that the brake mechanism of this invention can be used with any drawn rail-riding vehicle.

The primary purpose and object of this invention is to provide a novel brake mechanism for cable cars and the like which will automatically and instantly be actuated and operate to stop the vehicle in the event that the vehicle becomes disconnected from the towing means.

Another object is to provide novel braking mechanism of the type described which is adapted to automatically engage the wheel of the vehicle and bring said vehicle to a quick stop if the vehicle becomes disengaged from the towing means.

Another object is to provide a novel brake mechanism of the class described which is adapted to automatically engage the rail on which the vehicle is traveling so as to quickly stop the movement of said vehicle if the vehicle becomes disconnected from the towing means.

Still another object is to provide novel brake mechanism of the class described which embodies two separate braking means, one of which is adapted to engage the vehicle wheel, and the other of which is adapted to engage the rail on which the vehicle is traveling so as to automatically and quickly stop the vehicle in the event that it becomes disconnected from towing means.

More specifically, an object of this invention is to provide novel brake mechanism of the class described which includes a skid brake adapted to be wedged between the vehicle wheel and the rail and a jawed rail clamp which is adapted to firmly grasp the rail on which the vehicle is traveling.

Still another object is to provide a novel brake mechanism of the type immediately above described in which the wheel engaging brake skid and the rail clamp are adapted to be actuated substantially simultaneously and in which the rail clamp is adapted to be held in tensioned rail-clamping condition by the engagement of the brake skid with the wheel and rail.

2

These and other objects and advantages of this invention will more fully appear from the following description made in connection with the accompanying drawings wherein like reference characters refer to the same or similar parts throughout the several views, and in which:

FIG. 1 is a side elevational view of a cable car assembly constituting one preferred embodiment of this invention;

FIG. 2 is a top plan view of the dolley or cart assembly of FIG. 1;

FIG. 7 is an enlarged sectional view taken along line 7—7 of FIG. 2 and looking in the direction of the arrows.

Figure 4:
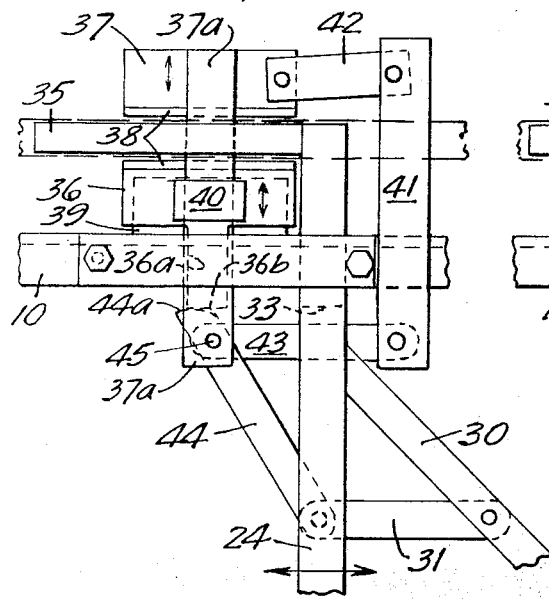
FIG. 4 is an enlarged top plan view of one side or portion of the vehicle with the brake mechanism in inoperative towing position.

Reference is now made to the accompanying drawings for a more detailed description and better understanding of this invention.

FIG. 1 shows a vehicle V riding on a pair of inclined rails R, which vehicle has a towing cable C connected to one end thereof, which cable in turn is connected to and operated by a motor-driven winch W located at the top of the incline. Only the main frame of the vehicle is shown, it being understood and recognized that any type of superstructure can be mounted on this frame for carrying and supporting passengers, equipment and the like.

The illustrated vehicle frame is of rectangular shape and includes a pair of elongate longitudinally extending side frame members 10, the ends of which are rigidly interconnected by a pair of end frame members 11 and 11'. The frame also includes three intermediate cross-members 12, 13 and 14 which are disposed intermediate the end members and extend between and are connected to the side frame members and which serve to reinforce the frame and also to support additional structure as hereinafter described.

Each of the side members is provided with a pair of apertured axle supporting brackets 15 disposed at opposite ends thereof which are adapted to receive and support the wheel axles 16 on each of which is rotatably mounted a double flanged wheel 17.

To tow the vehicle, a longitudinally oriented and reciprocable draw bar 18 is mounted on one end of the frame. The draw bar is slidably mounted on and supported by the frame members 11' and 14, and is maintained in position thereon by means of a pair of guide straps 19 and 20, mounted on members 11' and 14 respectively. The outer and inner ends of the draw bar are provided with stop members 21 and 22 respectively for limiting the longitudinal movement of the draw bar and preventing its disengagement from the frame. The outer end of the draw bar is provided with any suitable means such as the hook 23 for connecting the outer end thereof to the towing cable C.

The braking mechanism of this invention includes a main brake supporting frame which is slidably mounted on the vehicle frame for reciprocating movement longitudinally of the vehicle. This brake frame includes an elongate transversely disposed member 24 which spans the full width of the vehicle and extends laterally outwardly from the side frame members. The brake frame also includes an elongate longitudinally oriented member 25 which is slidably and reciprocably mounted on the frame member 13 by means of a guide strap 26 carried by frame member 13. One end of the center member 25 is connected to the transverse member 24 while the other end of member 25 has one end of a cable 27 connected thereto, the other of said cable being connected to the inner end of the draw bar 18. Cable 27 is trained about a pulley 28, which pulley is mounted on the inner end of a longitudinally disposed frame member 29, which constitutes a part of the vehicle frame and which is supported by and rigidly connected to the vehicle frame members 11 and 12. The brake frame also includes a pair of diagonally disposed bracing members 30 which extend between and are connected to members 24 and 25. (A pair of link members 31 extend between and are connected to members 44 and 30.)

A spring 32 is provided, one end of which is connected to the vehicle frame member 14 and the other end of which is connected to the brake frame member 25, which spring is extended and tensioned when the brake frame is in normal retracted towing position and which is adapted to urge and pull said brake frame forwardly so as to actuate the brake means and move them into operative position if the vehicle should become disconnected from the towing means such as by breakage of either of the cables C or 27.

To prevent lateral displacement of the brake frame member 24, said member is provided with a pair of guide shoes 33 disposed on opposite ends thereof, which shoes are adapted to engage the inner edge of their respective side frame members 10 so as to guide the longitudinal movement of the brake frame relative to the vehicle frame.

To prevent vertical displacement of the brake frame member 24 relative to the vehicle frame and to limit the longitudinal reciprocating movement of the brake frame, the member 24 is slidably disposed between the side frame members 10 and suitable guide straps 34 carried thereon. Each side of the vehicle is provided with a dual brake means, both of which are actuated by the reciprocating movement of the aforementioned brake frame, one of the brake means consisting of a skid member carried by the brake frame and adapted to brakingly engage the wheel, the other brake means consisting of a jawed rail clamp mounted on a side member of the vehicle frame and actuated by the movement of the brake frame.

Figure 6:
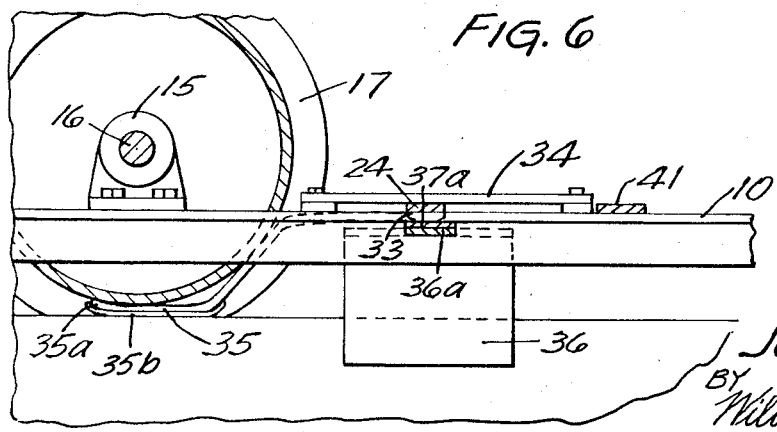
FIG. 6 is a view identical to FIG. 5 but with wheel engaging brake skid and related parts in braking position.

More specifically, the brake unit on each side of the vehicle includes an elongate longitudinally extending brake skid member 35 one end of which is attached to the outer end of the brake frame member 24 and extends therefrom forwardly towards the wheel 17' with which it is intended to engage. The skid is in alignment with the center of the wheel rim at the apex of the flanges thereof and is adapted to be moved by the forward movement of the brake frame between the wheel and the rail. The forward or outer free end portion of the skid is bent downwardly and forwardly as at 35a to facilitate the entry of the skid between the wheel and the rail, the wheel being adapted to ride up on the lower straight portion 35a. The lower surface of the brake skid member 35 is provided with brake lining material 35b as best seen in FIG. 6.

The rail clamp includes a pair of brake shoes 36 and 37 which are disposed opposite one another on opposite sides of the rail and are adapted for movement towards and away from each other into and out of braking engagement with said rail. The inner faces of each of the brake shoes are provided with suitable brake lining material 38. The inner brake shoe 36 is mounted for sliding movement on a brake shoe guide 39 which is carried by the side frame member 10 and extends laterally outwardly therefrom. The inner brake shoe 36 has a brake bar or shank 36a connected thereto which extends inwardly through a suitable opening provided in the side member so that the inner end thereof is disposed on the inside of the side frame member 10. The outer brake shoe 37 has a brake bar or shank 37a which extends across the gap between the two brake shoes and overlies the inner brake shoe and extends through the same opening in the side frame member 10 as brake bar 36a so as to be in overlying relationship therewith, the inner end of the bar 37a also being disposed on the inside of the frame member 10. To maintain the outer brake shoe in constant relationship to the inner brake shoe, the inner shoe is provided with a guide strap 40 which overlies the bar 37a so as to guide the movements thereof. To provide additional support for the outer brake shoe, a transverse member 41 is rigidly secured to the side frame member 10. The outer end of the transverse member is connected to the outer brake shoe by means of a link 42 which extends between and is pivotally connected to both the member 41 and the brake shoe 37. The inner brake shoe 36 of the outer brake shoe 37 are normally urged apart by a helical spring 36b as best seen in FIG. 7.

The transverse member 41 and the brake bar 37a are interconnected by a link 43 which is pivotally connected to both member 41 and bar 37a. Since the brake shoes of each rail clamp are capable of movement towards and away from each other, the brakes are self-adjustable for following any irregularities of the rail.

Figure 3:
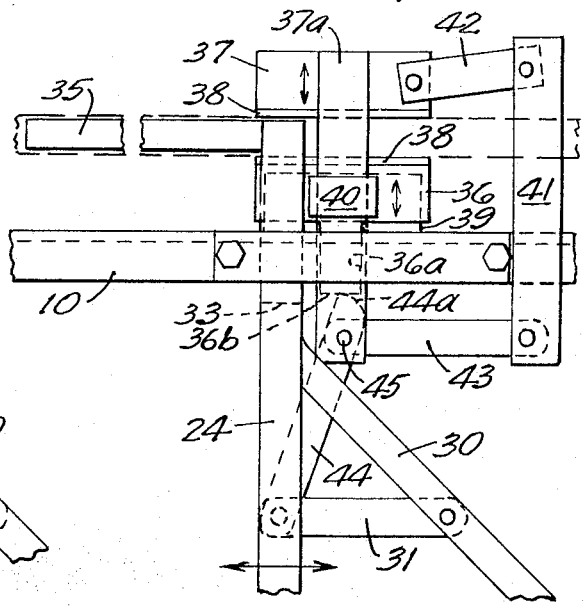
FIG. 3 is an enlarged top plan view of a portion or one side of the vehicle of FIG. 1 showing the brake mechanism in operative braking position.

A camming member 44 is provided which is pivotally connected at one end to a link member 31 and is pivotally connected at its other end to both the brake shoe bar 37a and the link 43, said members 37a, 43 and 44 being pivotally interconnected by a common pivot pin. The outer end of the cam member 44 is provided with a curved camming surface or edge 44a for effecting the locking and unlocking of the rail clamp in response to the movement of the brake frame. When the brake frame is fully retracted as it appears in FIG. 2, the brake shoes are unlocked and the cam member 44 is positioned as indicated in FIG. 4, being inclined forwardly with respect to brake frame member 24 with the cam surface 44a in engagement with the inner end 36b of the brake bar 36a. When the brake frame moves forwardly, under the influence of the spring 32, when the vehicle becomes disconnected from its towing means, the brake frame moves forwardly to the position shown in FIG. 3. As the brake frame moves forwardly, it moves the inner end of the cam member 44 forwardly and causes same to pivot about pivot pin 45 and move the cam surface 44a relative to and on the brake shoe bar end 36b, said cam surface thereby pushing the brake bar 36a and its brake shoe 36 outwardly towards and against the rail. The brake shoe 36 engages the rail before the forward movement of the brake frame and the swinging movement of the cam has been completed. Once the bar shoe 36 is in engagement with the rail, the continued movement of the cam effects an inward pull on the brake bar 37a through the pivot pin 45 and thereby pulls the outer brake shoe 37 towards and against the rail so that by the time the brake frame has completed its forward movement and the cam member has completed its swinging movement and has reached the terminal position illustrated in FIG. 3, both brake shoes 36 and 37 are in firm clamping relationship with their respective rail, and are maintained in that condition by the cam member.

The various components of the aforedescribed braking mechanism are preferably so designed and arranged that the skid bars 35 engage their respective wheels and are positively grabbed and acted upon thereby so as to be pulled forwardly by said wheels prior to the completion of the forward movement of the brake frame and the action of the cam so that the forward pull on the skid bars by the wheels completes the closing of the brake shoes which effects an extremely strong clamping force which is stronger than would normally be obtainable by presently available springs, which strong clamping force is maintained and continued by the continued clamping of the skid bars between the wheels and the rails so that no subsequent easing of tension or slippage will occur.

Thus, the engagement of the skid bars with the wheels serves as the primary source of pressure for holding the boot shoes of the rail clamps in braking engagement with the rails. Thus, in the aforementioned preferred embodiment, the spring 32 serves primarily as the means for bringing the skid bars 35 into initial engagement with the wheels with the grabbing action of the wheels on the skid bars thereafter serving to complete and maintain the clamping action of the rail clamps. This provides for strong positive clamping action and maintenance thereof, and enables a substantially lighter and less expensive spring arrangement to be used than would otherwise be possible if the clamping action were dependent solely upon the force exerted by the spring means.

Figure 5:
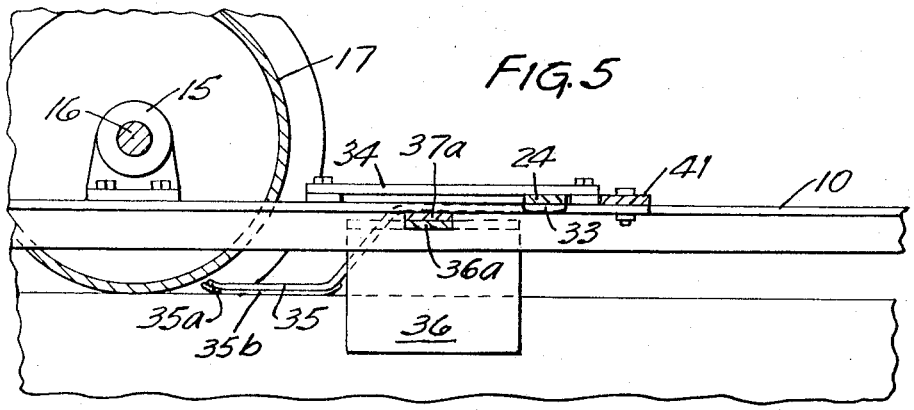
FIG. 5 is an enlarged sectional view taken along line 5—5 of FIG. 2 with inner wheel flange broken away and wheel engaging brake skid in towing position.

Thus, during normal usage when the vehicle is being supported and maintained on the rails by the cable C and said cable is under tension while the vehicle is either moving or in a static condition, the various component parts assume the position illustrated by the full line position of FIGS. 2, 4 and 5, in which condition the brake frame is fully retracted, the draw bar is fully extended forwardly, the brake skids are retracted and out of engagement with the wheels and the brake shoes of the rail clamps are open. If the cables C or 27 should break, or the vehicle should in any other way become disconnected from the towing means, the tension on the cables C and 27 are relieved, and the spring 32 pulls the brake frame forwardly causing the various component parts to ultimately assume the broken line positions of FIG. 2. As the brake frame moves forwardly under the influence of the spring, the skid bars are brought into engagement with their respective wheels 17' and cam member 44 begins its swinging movement to actuate the brake shoes of the rail clamps. As the skid bars 35 engage the wheels, they are drawn thereunder between the wheels and the rail and are grabbed and pulled forwardly by the wheels, this grabbing and pulling action on the skid bars by the wheels being transmitted to the brake frame and the various parts connected therewith to complete the clamping action of the brake shoes and cause the car to come to a quick stop. The braking action is, of course, effected by the frictional engagement of the brake shoes with the rail and the frictional engagement of the skid bars with the rail. Once stopped, the resistance to further movement is continued by the continued holding of the skid bars against the rails by the wheels, the entire weight of the vehicle and anything carried thereon being transmitted to the brake skids through the wheels so as to maintain a strong frictional engagement of the skid bars with the rails and also to prevent any retractive movement on the part of the skid bars which might relieve some of the clamping pressure on the brake shoes.

It will, of course, be understood that various changes may be made in the form, details, arrangement and proportions of the various parts without departing from the scope of my invention.

What I claim is:

1. A drawn rail-riding wheeled vehicle which includes first brake means adapted to engage a vehicle wheel, second brake means comprising a clamp having a pair of cooperating jaw members which are adapted to engage opposite sides of the rail and clamp the same therebetween, means connecting both of said brake means with means for towing said vehicle, said brake means being maintained in an inoperative condition by said connecting means when said connecting means is subjected to a towing force, said first and second brake means being adapted to automatically brakingly engage their respective wheel and rail when said connecting means is relieved of said force.

2. The vehicle of claim 1, wherein said first brake means comprises a member adapted to be wedged between the wheel and the rail.

3. The vehicle of claim 1, wherein said first brake means comprises an elongate skid member adapted to be wedged between the wheel and the rail so that the wheel is separated from the rail by said member and rests upon that member and holds said member in frictional engagement with the rail.

4. The vehicle of claim 1, including means for actuating both of said means when said connecting means is relieved of said towing force.

5. The vehicle of claim 1, wherein said first brake means comprises a member adapted to be wedged between the wheel and the rail, and including means adapted to simultaneously actuate both of said brake means when said connecting means is relieved of said force.

6. The vehicle of claim 1, and resilient means for normally urging the jaw members of said brake clamp into engaging non-braking relation with the rail when said brake clamp is in the inoperative condition whereby said brake clamp is capable of limited self-adjustment to follow irregularities of the rail.

7. A drawn rail-riding wheeled vehicle which includes a first brake means adapted to be clamped between the wheel and the rail, a second brake means adapted to engage a rail, means connecting both of said brake means with means for towing said vehicle, said brake means being maintained in an inoperative condition by said connecting means when said connecting means are subjected to a towing force, said first and second brake means being adapted to automatically brakingly engage their respective wheel and rail when said connecting means is relieved of said force, and said first and second brake means being operatively connected so the second brake means is maintained in braking engagement with the rail by the clamping of said first brake means between the wheel and the rail.

8. A drawn rail-riding wheeled vehicle which includes a brake frame mounted on the vehicle frame for reciprocating movement longitudinally thereof, an elongated brake bar carried by said frame and oriented longitudinally of the rail in overlying relationship therewith, a rail clamp including a pair of brake shoes disposed on opposite sides of the rail and adapted to clamp the rail therebetween, means operatively connected to said brake frame and adapted to actuate said rail clamp in response to the reciprocating movement of said brake frame, said brake frame being movable between a first position in which both of said brake means are inoperative and a second position in which both of said brake means are operative, spring means connected to said brake frame and the vehicle frame and adapted to pull the brake frame towards the second position when it is in said first position, draw bar means carried by said vehicle frame and adapted for reciprocating movement longitudinally thereof between a towing and a non-towing position, means operatively interconnecting said draw-bar means and brake frame whereby said brake frame is held by said draw-bar means and said connecting means in said first position when said draw-bar means is in said towing position and whereby said brake frame is free to move from the first position to said second position under the influence of said spring means when said draw-bar means moves from towing to non-towing position, the movement of said brake frame from said first to said second position causing said brake bar to move into wedged clamped engagement between the wheel and the rail and moving said means to cause actuation of the rail clamp thereby into clamping engagement with the rail.

9. A drawn rail riding wheeled vehicle which includes first brake means adapted to be wedged between a vehicle wheel and the rail on which it is riding so that the wheel is separated from the rail by said brake means and rests thereon and holds said brake means in frictional engagement with the rail, second brake means comprising a pair of cooperating jaw members which are adapted to clamp a rail therebetween and means operatively connecting said first and second brake means whereby said jaw members are held in clamping engagement with their respective rail by the wedged relationship between said first brake means and its respective wheel and rail.

References Cited

UNITED STATES PATENTS

| 997,810 | 7/1911 | Hauser | 188—125 |
| 1,263,872 | 4/1918 | Elie | 188—35 |
| 2,415,263 | 2/1947 | Stone | 188—36 |

DUANE A. REGER, *Primary Examiner.*